United States Patent
Hyun et al.

(10) Patent No.: US 7,181,078 B2
(45) Date of Patent: Feb. 20, 2007

(54) APPARATUS AND METHOD FOR COMPRESSING/DECOMPRESSING IMAGES IN A MOBILE COMMUNICATION TERMINAL

(75) Inventors: Dae-Seong Hyun, Kumi-shi (KR); Sung-Min Cho, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 770 days.

(21) Appl. No.: 10/435,379

(22) Filed: May 12, 2003

(65) Prior Publication Data

US 2003/0215148 A1 Nov. 20, 2003

(30) Foreign Application Priority Data

May 16, 2002 (KR) .............................. 2002-27139

(51) Int. Cl.
- G06K 9/36 (2006.01)
- G06K 9/46 (2006.01)

(52) U.S. Cl. ...................................... 382/244; 382/233
(58) Field of Classification Search ................ 382/233, 382/244, 245; 341/59
See application file for complete search history.

(56) References Cited

U.S. PATENT DOCUMENTS

| 4,168,513 A * | 9/1979 | Hains et al. ................. 382/244 |
| 6,748,116 B1 * | 6/2004 | Yue ............................ 382/238 |
| 7,031,540 B2 * | 4/2006 | De Bonet .................... 382/244 |

* cited by examiner

Primary Examiner—Phuoc Tran
(74) Attorney, Agent, or Firm—Roylance, Abrams, Berdo & Goodman, L.L.P.

(57) ABSTRACT

An apparatus and method for compressing/decompressing an image in a mobile communication terminal. The apparatus and method compresses or decompresses image data by setting up an optimal threshold. The image compression apparatus and method includes setting initial data of a graphic image to comparison data, determining whether the same data as the comparison data is repeated after the comparison data, determining whether the comparison data is greater than a predetermined threshold, if the same data as the comparison data is not repeated after the comparison data, and storing the comparison data without storing the number of times the comparison data is repeated, if the comparison data is greater than the predetermined threshold.

12 Claims, 5 Drawing Sheets

APPARATUS AND METHOD FOR COMPRESSING/DECOMPRESSING IMAGES IN A MOBILE COMMUNICATION TERMINAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsover.

PRIORITY

This application claims priority under 35 U.S.C. § 119 to an application entitled "METHOD FOR COMPRESSING/DECOMPRESSING IMAGES IN MOBILE COMMUNICATION TERMINAL", filed in the Korean Industrial Property Office on May 16, 2002 and assigned Serial No. 2002-27139, the contents of which are incorporated herein by reference.

BACKGROUND OF THE INVENTION

1. Field of the Invention

The present invention relates to an apparatus and method for compressing/decompressing images in a mobile communication terminal, and more particularly to an apparatus and method for compressing or decompressing image data by establishing an optimal threshold.

2. Description of the Related Art

A mobile communication terminal typically requires a large amount of storage memory to perform multimedia functions implemented with a variety of graphic tools, in addition to performing general phone functions. However, as 16-bit images and a large number of content are being widely and rapidly used in the mobile communication terminal, there is a waste of memory in even a common memory with a capacity of 16 MB. An image used in a mobile terminal is classified into a graphic image such as an icon or background and a picture image such as a photo. These images are composed of bitmap images. Each pixel contained in each image is composed of only one unit of data. In particular, there is a high possibility that the same data may be successively arranged in the graphic image, but the picture image is unlikely to contain such successive same data. The graphic image has a plurality of repeating data, such that the waste of memory can be obviated by reducing the size of the data. A representative example for obviating the waste of memory is by reducing a font size contained in a memory's code, that is, the size of graphic data. Preferably, the graphic data should be compressed using a high compression ratio or decompressed using a high decompression speed. However, there is a disadvantage in that a compression algorithm is complicated and a large number of calculations are unavoidably performed to attain such a high compression ratio. A small amount of data is provided on the condition that the graphic data is compressed as the above and stored in a mobile phone, resulting in creating much more storage space in a memory. It takes a long period of time to restore a compressed image to an original image using such a complicated algorithm. A current mobile communication terminal basically displays a color image thereon and needs to display a high-speed image such as a moving image on a large-sized LCD (Liquid Crystal Display). This requires a large number of calculations, such that the decompression speed should not be ignored even though there is enough space available in memory due to the high compression ratio. If the decompression speed is reduced, a variety of functions of a mobile phone, for example, a phone call function, and a data communication function, and so on, may be seriously impaired. Therefore, the decompression speed should be considered an important issue in an image compression process for the mobile communication terminal.

Figure 1:
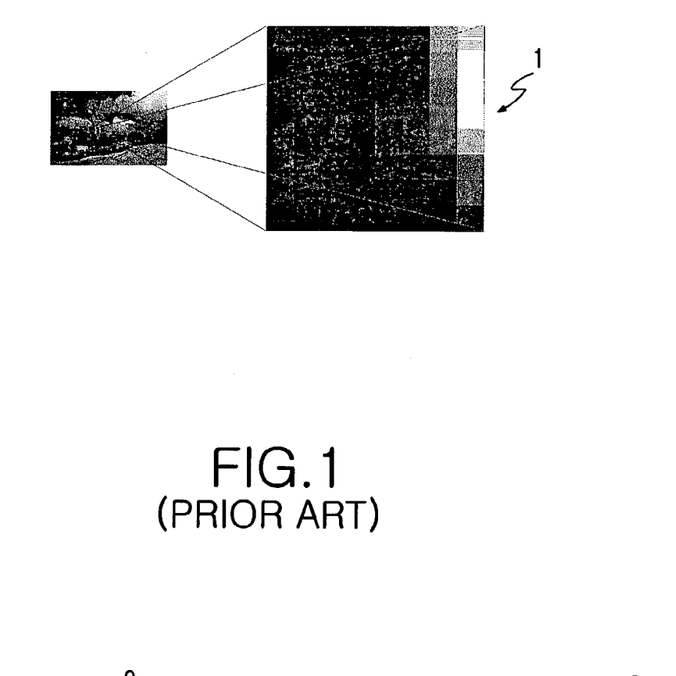
FIG. 1 is an enlarged diagram illustrating an example of one pixel implemented with bitmap data of a color graphic image of a conventional mobile communication terminal.

FIG. 1 is an enlarged diagram illustrating an example of one pixel 1 implemented with a bitmap data of a color graphic image of a conventional mobile communication terminal.

Referring to FIG. 1, 16-bit data values for colors contained in the enlarged pixel 1 are shown in the following Table 1.

TABLE 1

| 0xda29 | 0xfc28 | 0xfc28 | 0xfc28 | 0xfc28 | 0xfc28 | 0xeba7 | 0xba2d |
|--------|--------|--------|--------|--------|--------|--------|--------|
| 0xd86d | 0xfc28 | 0xfc28 | 0xfc28 | 0xfc28 | 0xfc28 | 0xcb29 | 0xcb29 |
| 0xf8ed | 0xfc28 | 0xfc28 | 0xfc28 | 0xfc28 | 0xfc28 | 0xcb29 | 0xcb29 |
| 0xf92d | 0xf8ed | 0xd8ed | 0xa8ab | 0xc9a9 | 0xc969 | 0xcb29 | 0xed77 |
| 0xf92d | 0xf92d | 0xe92d | 0xc8eb | 0xcab1 | 0xc92d | 0xfdfb | 0xfe7d |
| 0xf92d | 0xf92d | 0xf92d | 0xd8eb | 0xcab0 | 0xdbb3 | 0xec77 | 0xfdfb |
| 0xf92d | 0xf92d | 0xf92d | 0xd94d | 0xb869 | 0xfdfb | 0xfdfb | 0xfbfb |
| 0xf8ed | 0xf8ed | 0xf8ed | 0xd92d | 0xb8eb | 0xfdfb | 0xfdfb | 0xfdfb |

Referring to the above Table 1, data "0xfc28" are repeated in a first column, data "0xfc28" and data "0xcb29" are respectively repeated in second and third columns, data "0xf92d" are repeated in fifth and sixth columns, and data "0xf92d" and data "0xfdfb" are respectively repeated in seventh and eighth columns.

Figure 2A:
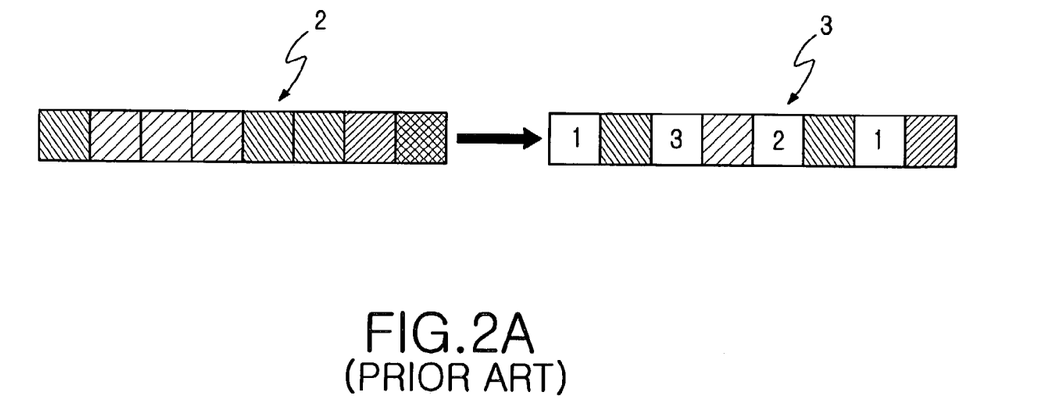
FIG. 2A is a diagram illustrating an example of the configuration of a memory adapted to a graphic image compression process for the conventional mobile communication terminal.

FIG. 2A is a diagram illustrating an example of the configuration of a memory adapted to a graphic image compression process for a conventional mobile communication terminal.

Referring to FIG. 2A, a plurality of data of the same color are successively arranged on an uncompressed graphic image 2, such that these same color data are compressed in the form of "the number of repeating times of data + data", resulting in a compressed graphic image 3 for increasing available space in a memory.

Numerals shown in FIG. 2A designate the number of times the same data is repeated.

Figure 2B:
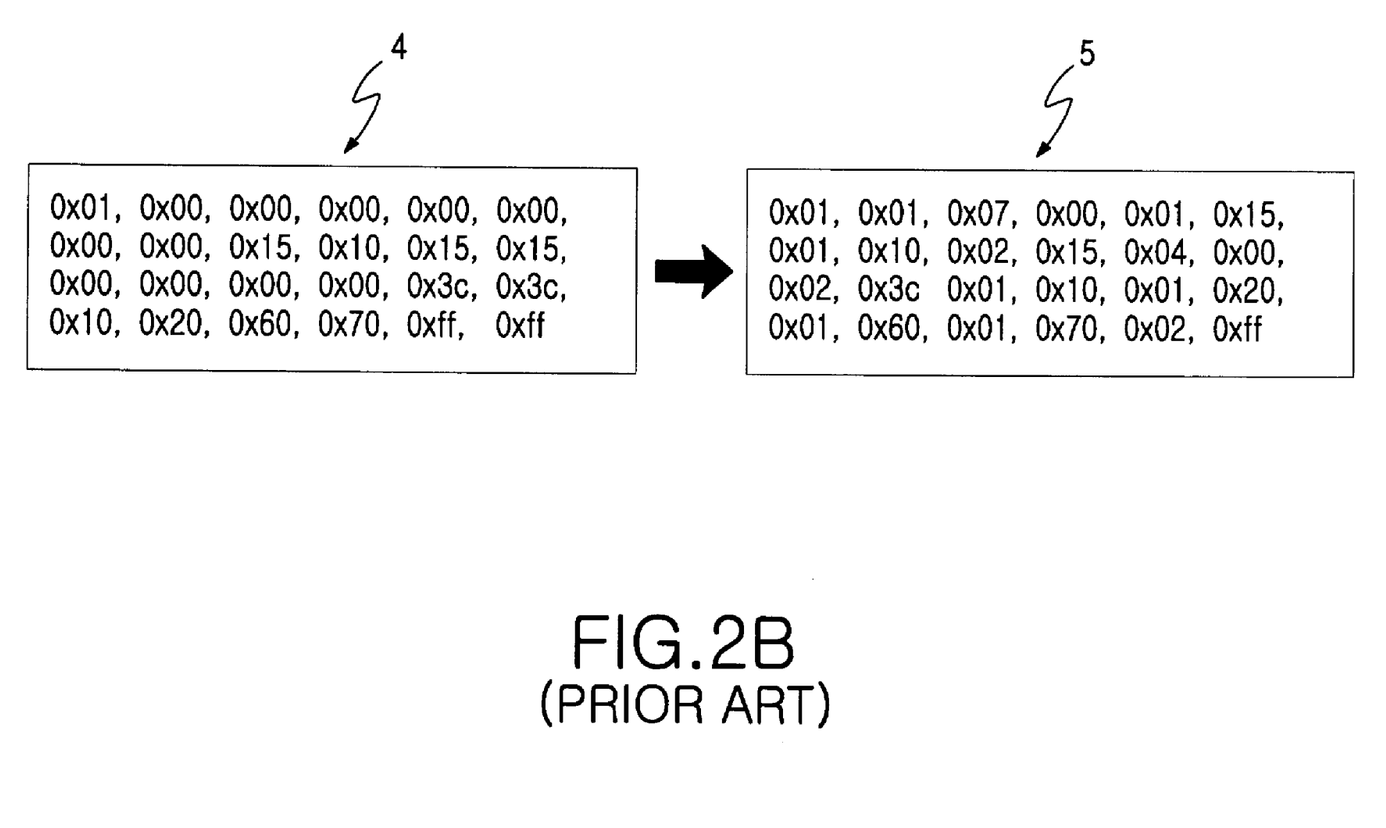
FIG. 2B is a diagram illustrating an example of a graphic image compression process of the conventional mobile communication terminal.

FIG. 2B is a diagram illustrating an example of a graphic image compression process of a conventional mobile communication terminal.

The graphic image compression process shown in FIG. 2B is executed using a 256-color image having 8 bits for each pixel. Referring to FIG. 2B, data "0x01" appears once and data "0x00" is repeated seven times in first and second columns of uncompressed data 4. Subsequently, data "0x15" appears once, data "0x10" occurs once, and data "0x15" is subsequently repeated twice in the second column of the uncompressed data 4. Data "0x00" is repeated four times and data "0x3c" is repeated twice in the third column of the uncompressed data 4. Data "0x10" appears once, data "0x20" appears once, data "0x60" is appears once, data "0x70" is appears once, and data "0xff" is repeated twice in the fourth column of the uncompressed data 4. When the uncompressed data 4 repeated as described above it is compressed in the form of "the number of times data is repeated+data". That is, the uncompressed data 4 is compressed in the form of 0x01, 0x01, 0x07, 0x00, 0x01, 0x15, 0x01, 0x10, 0x02, 0x15, 0x04, 0x00, 0x02, 0x3c, 0x01, 0x10, 0x01, 0x20, 0x01, 0x60, 0x01, 0x70, 0x02, and 0xff. In more detail, as shown in compressed data 5 of FIG. 2b, data "0x01" appears once, data "0x00" is repeated seven times, data "0x15" appears once, data "0x10" appears once, data "0x15" is repeated twice, data "0x 00" is repeated four times, data "0x 3c" is repeated twice, data "0x10" appears once, data "0x20" is appears once, data "0x60" appears once, data "0x70" appears once, and data "0xff" is repeated twice in such a way that the uncompressed data 4 is compressed in the form of data 5, resulting in creating the compressed data 5.

Functions for implementing the aforementioned compression method will hereinafter be described in detail. Specifically, the following software algorithm provides an example of a means for implementing the compression method. It should be noted that parameters for the functions are an address value and a size (denoted by a prescribed unit such as a byte) of an image to be compressed.

```
byte* image_compress_1(byte * Before_ImagePtr, int ImageSize)
{
    static byte Image_buf1[row_max * 2][col_max]; // buffer for
storing a compressed image
        byte* After_ImagePtr = (byte *)Image_buf1 ;
        byte CompareImapge = *Before_ImagePtr, count =1 ;
        int i;
    for(i=0; i <ImageSize ; i++)
    {
        if(CompareImage == *++Before_ImagePtr)
        {
            count++;
        } else {
            *After_ImagePtr++ = count;
            *After_ImagePtr++ = CompareImage;
            CF_size1 += 2;   /*Count the number of compressed data to examine
a compression ratio*/ /* Set up a new value when the same values are discontinuously
arranged */
            count = 1;
            CompareImage = *Before_ImagePtr;
        }
    }
    return ((byte *)Image_buf1);
}
```

The aforementioned conventional compression algorithm has a high compression ratio when a large number of repeating data occurs. However, as shown in the compressed data 5 of FIG. 2b, the number of data contained in a data group of 0x01, 0x07, 0x10y, 0x01, 0x02, 0x04, 0x01, 0x01, 0x01, and 0x02 is indicative of the number of times repeating data is identical with the number of other data contained in the other data group of 0x01, 0x00, 0x15, 0x10, 0x15, 0x00, 0x3c, 0x10, 0x20, 0x60, 0x70, and 0xff which is indicative of repeating data, such that the uncompressed data 4 is not compressed at all.

In more detail, two data (i.e., the number of repeating times of data+data) may be frequently required in the case of compressing/storing only one unit of data, resulting in an overhead. In this way, the conventional compression method unavoidably increases the amount of data whereas it considerably reduces the number of data according to the type of images.

SUMMARY OF THE INVENTION

Therefore, the present invention has been made in view of the above problems, and it is an object of the present invention to provide an apparatus and method for increasing a compression ratio by prescribing an optimal threshold when compressing graphic data of a mobile communication terminal.

It is another object of the present invention to provide an apparatus and method for very rapidly decompressing the graphic data compressed using the optimal threshold.

In accordance with the present invention, the above and other objects can be substantially accomplished by an image compression apparatus and method for a mobile communication terminal. The apparatus and method perform the operations of setting initial data of a graphic image to comparison data; determining whether the same data as the comparison data is repeated after the comparison data; determining whether the comparison data is greater than a predetermined threshold, if the same data as the comparison data is not repeated after the comparison data; and storing the comparison data without storing the number of times the comparison data is repeated, if the comparison data is greater than the predetermined threshold.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS embodiments of the present invention will be described in detail with reference to the accompanying drawings. In the drawings, the same or similar elements are denoted by the same reference numerals. Also, a detailed description of known functions and configurations have been omitted for conciseness.

Figure 3:
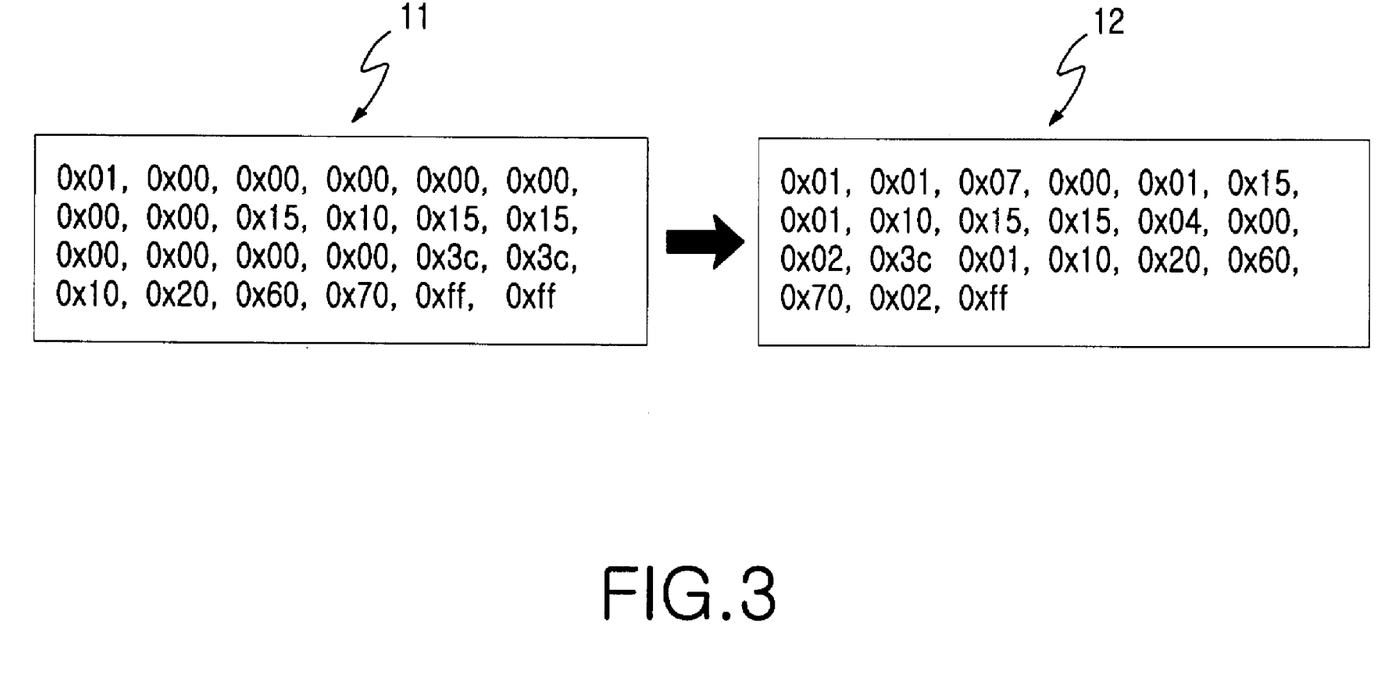
FIG. 3 is a diagram illustrating a graphic image compression process in accordance with an embodiment of the present invention.

FIG. 3 is a diagram illustrating an example of a graphic image compression process in accordance with an embodiment of the present invention.

Referring to FIG. 3, data "0x01" appears once and data "0x00x" is then repeated seven times in first and second columns of uncompressed data 11. Subsequently, data "0x15" appears once, data "0x10" appears once, and data "0x15" is then repeated twice in the first and second columns of the uncompressed data 11. Data "0x00" is repeated four times and data "0x3c" is repeated twice in a third column of the uncompressed data 11. Data "0x10" appears once, data "0x20" appears once, data "0x60" appears once, data "0x70" appears once, and then data "0xff" is repeated twice in a fourth column of the uncompressed data 11.

When the uncompressed data 11 repeated as the above, has only one data, a threshold value is predetermined to avoid storing the number of times the data is repeated. Therefore, in the case where the number of times the data is repeated is higher than the threshold value, the number of times the data is repeated is set to a number '1' whereas the remaining repeating data other than this set number are discarded. When data higher than the threshold value is repeated more than a prescribed number of times, the number of times the data is repeated the data is divided by a prescribed value less than the threshold value, and then the resultant data is stored. In more detail, although data greater than the threshold value is repeated many times, a specific section for indicating the number of times the data is repeated records a number '1' as the overall number of repeating times for the data, such that any value greater than the threshold value is always set to a number '1' as the number of times its repeated. For example, when a compression format of "the number of repeating times of data+data" is provided using a threshold value "0x20", and the number of repeating times of the data is higher than "0x20", a first value corresponding to "the number of repeating times of data+data" becomes "0x1F+data".

When the uncompressed data 11 is compressed with its own optimal threshold value "0x20", there is obtained a resultant compression form of 0x01, 0x01, 0x07, 0x00, 0x01, 0x15, 0x01, 0x10, 0x02, 0x15, 0x04, 0x00, 0x02, 03c, 0x01, 0x10, 0x20, 0x60, 0x70, 0x02, and 0xff. In more detail, data "0x01" appears once, data "0x00" is then repeated seven times, data "0x15" appears once, data "0x10" appears once, data "0x15" is repeated twice, data "0x00" is repeated four times, data "0x3c" is repeated twice, and data "0x10" appears once in such a way that the uncompressed data 11 is compressed and stored. In addition, as shown in a compressed data 12 of FIG. 3, data "0x20", data "0x60", and data "0x70" that are higher than the threshold value "0x20" are respectively stored once, irrespective of the number of times they are repeated. Subsequently, data "0ff" is repeated twice in the compressed data 12.

Functions for implementing the above compression method according to the present invention will hereinafter be described in detail.

```
byte* image_compress_2(byte * Before_ImagePtr, int ImageSize)
{
    static byte Image_buf2[row_max * 2][col_max];
    byte* After_ImagePtr = (byte *)Image_buf2 ;
    byte ComparaImage = *Before_ImagePtr, count =1 ;
    int i;
    for(i=0 ; i < ImageSize ; i++)
    {
        if((CompareImage == *++Before_ImagePtr) && (i < ImageSize-1)
        {
            if(count == (LIMIT_VALUE-1))
            {
                *After_ImagePtr++ = count;
                *After_ImagePtr++ = CompareImage;
                count = 1;
                CF_size2 += 2;
            }else{
                count++;
            }
        }else{
            if(CompareImage < LIMIT_VALUE II count != 1 ){
                *After_ImagePtr++ = count;
                *After_ImagePtr++ = CompareImage;
                CF_size2 += 2;
```

```
            }else{
                *After_ImagePtr++ = CompareImage;
                CF_size2 ++;
            }
            count = 1;      /* Set up a new value when the same values are
successively arranged */
            CompareImage = *Before_ImagePtr;
        }
    }
    return((byte *)Image_buf2);
}
```

With reference to the above function, a reference character "LIMIT_VALUE" is a threshold value. A function for decompressing an image compressed with the threshold value will hereinafter be described in detail.

```
byte *extract_image2(byte *image_ptr, int Imagesize)
{
    static byte temp_buf[36]; //Exemplary size for use in Fig. 3
        byte *temp_ptr = temp_buf;
    byte *extract_size = temp_ptr + Imagesize;
    byte i ;
    while(temp_ptr < extract_size)
    {
        if(*image_ptr < LIMIT_VALUE )
        {
            for(i = *image_ptr++; i >0 ; i--)
                *temp_ptr++ = *image_ptr;
            image_ptr++;
        }
        else
        {
            temp_ptr++ = *image_ptr++;
        }
    }
    return(temp_buf);
}
```

The aforementioned function for decompressing a compressed image can be implemented with a relatively short routine. In the case where the reference character LIMIT_VALUE is set to "0x20", the compressed image is decompressed with "the number times data is repeated+data". In this case, provided that a value of "the number of times data is repeated" is higher than "0x20", there is no need to decompress the compressed image with any data that appears only once.

Figure 4:
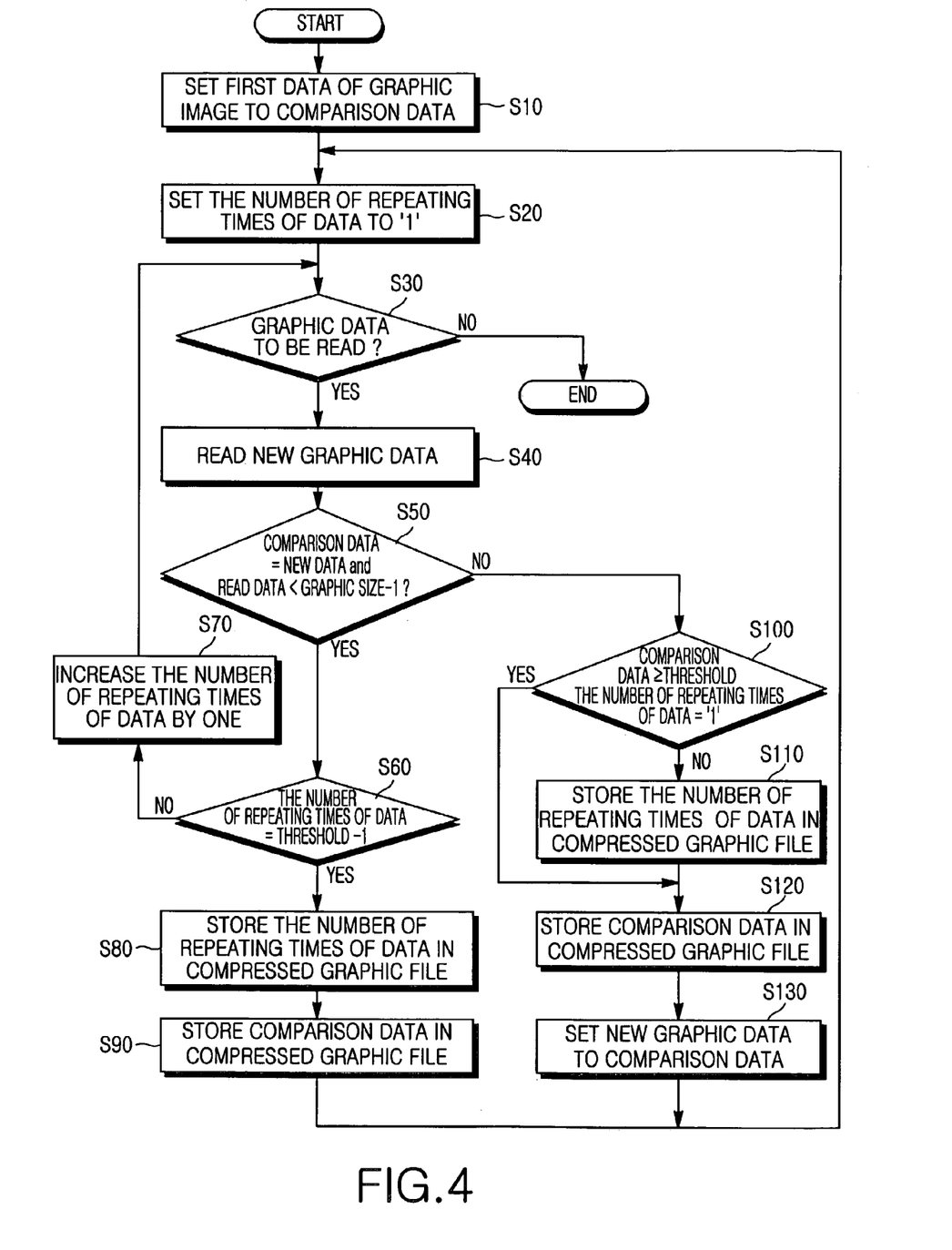
FIG. 4 is a flow chart illustrating an example of steps for compressing a graphic image of a mobile communication terminal in accordance with an embodiment of the present invention.

FIG. 4 is a flow chart illustrating an example of steps for compressing a graphic image of a mobile communication terminal in accordance with an embodiment of the present invention.

Referring to FIG. 4, a processor of a mobile communication terminal sets first data of a graphic image to comparison data in step S10. The number of times data is repeated is set to '1' in step S20. The processor determines whether there is graphic data to be read from the graphic image in step S30. If it is determined in step S30 that there is graphic data to be read from the graphic image, the processor reads new graphic data in step S40. The processor determines whether the comparison data is identical with the new graphic data and whether the new read data is less than "graphic size-1" in step S50. If it is determined in step S50 that the new graphic data is identical with the comparison data, and that the read data is less than "graphic size-1", the processor determines whether the number of times data is repeated is "threshold-1" in step S60. If it is determined in step S60 that the number of times data is repeated is different from the value of "threshold-1", the processor increases the number of times data is repeated by one in step S70.

If it is determined in step S60 that the number of times data is repeated is identical with the value of "threshold-1", the number of times data is repeated is stored in a compressed graphic file in step S80. Thereafter, the comparison data is stored in the compressed graphic file in step S90, and returns to step S20 such that the number of times data is repeated is set to '1'.

On the other hand, if it is determined in step S50 that the new graphic data is different from the comparison data, the processor determines in step S100 whether the comparison data is greater than a threshold value and the number of times data is repeated for the comparison data is '1'.

When the number of times data is repeated for the comparison data is greater than '2' in step S100, the number of times data is repeated for the comparison data is stored in the compressed graphic file in step S110. Subsequently, the comparison data is stored in the compressed graphic file in step S120.

However, when the comparison data is greater than the threshold value in step S100 and the number of times data is repeated for the comparison data is '1', the processor stores only the comparison data in the compressed graphic file in step S120.

Subsequently, the processor sets the new graphic data from among the graphic image to the comparison data in step S130, and returns to step S20, such that the number of times data is repeated is determined to be '1' in step S20.

Figure 5:
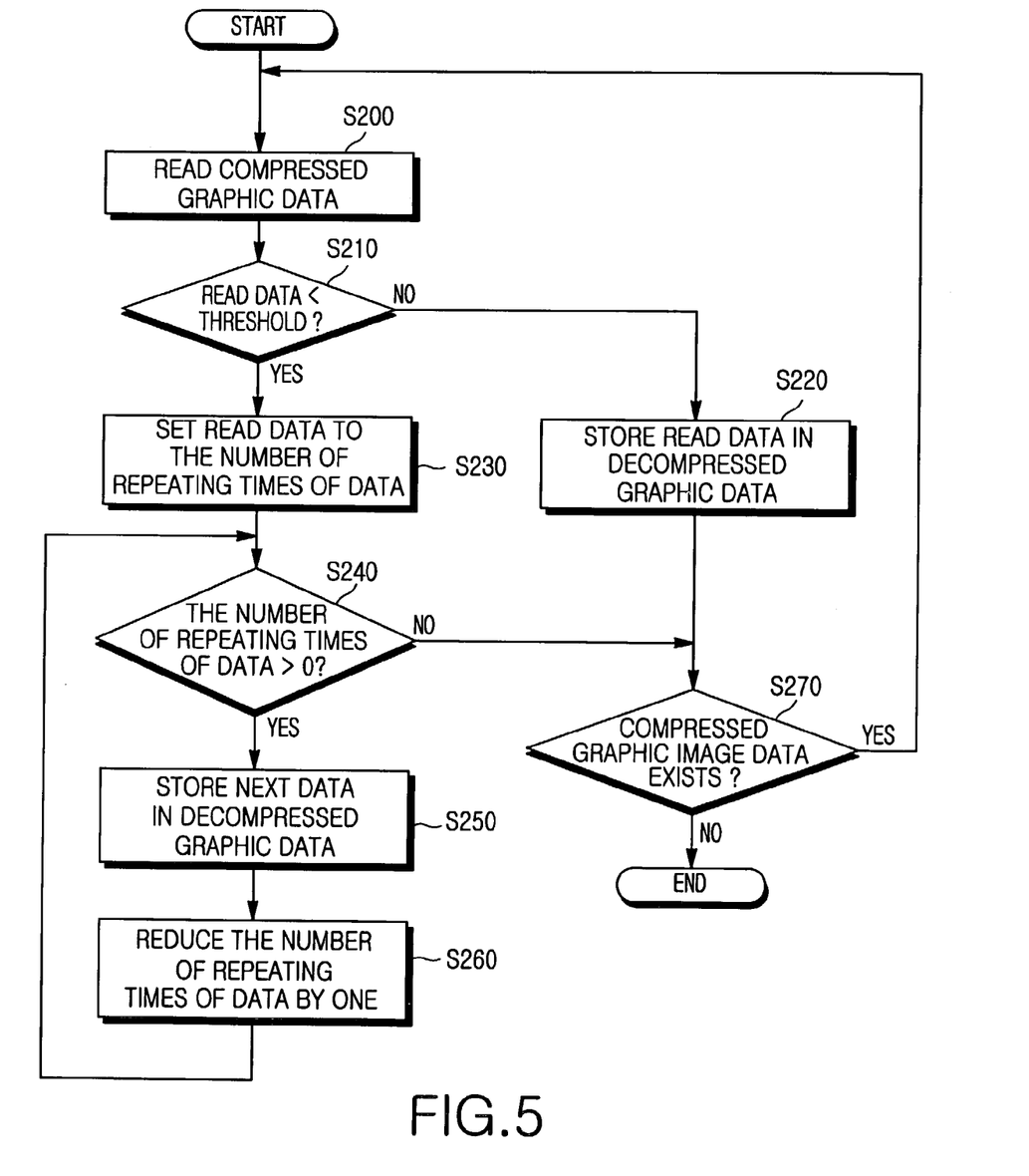
FIG. 5 is a flow chart illustrating an example of steps for decompressing a graphic image of a mobile communication terminal in accordance with an embodiment of the present invention.

FIG. 5 is a flow chart illustrating an example of steps for decompressing a graphic image of a mobile communication terminal in accordance with an embodiment of the present invention.

Referring to FIG. 5, a processor reads graphic data of a compressed graphic image in step S200, and determines whether the read data is less than a threshold value at step S210. If the read data is greater than the threshold value in step S210, then the processor stores the read data in decompressed graphic data in step S220. If the read data is less than the threshold value in step S210, then the processor sets the read data to the number of times data is repeated in step S230. The processor determines in step S240 whether the number of times data is repeated is greater than '0'. If the number of times data is repeated is greater than '0' in step S240, the processor stores the next data of the number of times data is repeated in the decompressed graphic data in step S250. The processor reduces the number of times data is repeated by one in step S260. Subsequently, the processor repeatedly performs steps S240 to S260 before the number of times data is repeated is to be '0' in such a way that the decompression process is established.

When the number of times data is repeated is '0' in step S240, the processor determines whether there is compressed graphic data in step S270. Thereafter, if it is determined that the compressed graphic data exists in step S270, the processor reads new data. If it is determined that there is no compressed graphic data in step S270, the decompression process is terminated.

In addition, after the read data has been stored in the decompression graphic data in step S220, the processor determines whether there is compressed graphic data in step S270. If it is determined that the compressed graphic data exists in step S270, the processor reads new data in step S200. If it is determined that there is no compressed graphic data in step S270, the decompression process is terminated.

As apparent from the above description, the present invention provides an apparatus and method for increasing a compression ratio by prescribing an optimal threshold in the case of compressing graphic data of a mobile communication terminal, as well as an apparatus and method for very rapidly decompressing the graphic data compressed with the optimal threshold.

Although embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image compression method for a mobile communication terminal, comprising the steps of:
   a) setting initial data of a graphic image to comparison data;
   b) determining whether the same data as the comparison data is repeated after the comparison data;
   c) determining whether the comparison data is greater than a predetermined threshold, if the same data as the comparison data is not repeated after the comparison data; and
   d) storing the comparison data without storing the number of times the comparison data is repeated, if the comparison data is greater than the predetermined threshold.

2. The method as set forth in claim 1, wherein the step (a) includes the step of:
   a1) determining whether the number of times the comparison data is repeated is identical with a value lower than the threshold, if the same data as the comparison data is repeated after the comparison data.

3. The method as set forth in claim 2, wherein the step (a) further includes the step of:
   a2) compressing/storing the number of times the comparison data is repeated along with the comparison data, if the number of times the comparison data is repeated is identical with the value lower than the threshold.

4. An image decompression method, comprising the steps of:
   a) determining whether data read from compressed graphic data is greater than a prescribed threshold;
   b) storing the read data in decompressed graphic data, if the read data is greater than the threshold;
   c) setting the read data to the number of times the data is repeated, if the read data is less than the threshold; and
   d) repeating for a next data the number of times the data is repeated, and storing the repeated next data in the decompressed graphic data.

5. An apparatus for image compression for a mobile communication terminal, comprising:
   means for setting initial data of a graphic image to comparison data;
   means for determining whether the same data as the comparison data is repeated after the comparison data;
   means for determining whether the comparison data is greater than a predetermined threshold, if the same data as the comparison data is not repeated after the comparison data; and
   means for storing the comparison data without storing the number of times the comparison data is repeated, if the comparison data is greater than the predetermined threshold.

6. The apparatus as set forth in claim 5, further comprising means for determining whether the number of times the comparison data is repeated is identical with a value lower than the threshold, if the same as the comparison data is repeated after the comparison data after the comparison data.

7. The apparatus as set forth in claim 6, further comprising means for compressing/storing the number of times the comparison data is repeated along with the comparison data, if the number of times the comparison data is repeated is identical with the value lower than the threshold.

8. An apparatus for image decompression for a mobile communication terminal, comprising:
   means for determining whether data read from compressed graphic data is greater than a prescribed threshold;
   means for storing the read data in decompressed graphic data, if the read data is greater than the threshold;
   means for setting the read data to the number of times the data is repeated, if the read data is less than the threshold; and
   means for repeating for a next data the number of times the data is repeated, and store the repeated next data in the decompressed graphic data.

9. A computer-readable medium of instructions for controlling the operation of image compression for a mobile communication terminal, said computer-readable medium of instructions comprising:
   a first set of instructions, adapted to control the mobile communication terminal to set initial data of a graphic image to comparison data;
   a second set of instructions, adapted to control the mobile communication terminal to determine whether the same data as the comparison data is repeated after the comparison data;
   a third set of instructions, adapted to control the mobile communication terminal to determine whether the comparison data is greater than a predetermined threshold, if the same data as the comparison data is not repeated after the comparison data; and
   a fourth set of instructions, adapted to control the mobile communication terminal to store the comparison data without storing the number of times the comparison data is repeated, if the comparison data is greater than the predetermined threshold.

10. The computer-readable medium of instructions as set forth in claim 9, wherein the processor is further adapted to include a fifth set of instructions to determine whether the number of times the comparison data is repeated is identical with a value lower than the threshold, if the same data as the comparison data is repeated after the comparison data.

11. The computer-readable medium of instructions as set forth in claim 10, wherein the processor is further adapted to include a sixth set of instructions to compress/store the number of times the comparison data is repeated along with the comparison data, if the number of times the comparison data is repeated is identical with the value lower than the threshold.

12. A computer-readable medium of instructions for controlling the operation of image decompression for a mobile communication terminal, said computer-readable medium of instructions comprising:

a first set of instructions, adapted to control the mobile communication terminal to determine whether data read from compressed graphic data is greater than a prescribed threshold;

a second set of instructions, adapted to control the mobile communication terminal to store the read data in decompressed graphic data, if the read data is greater than the threshold;

a third set of instructions, adapted to control the mobile communication terminal to set the read data to the number of times the data is repeated, if the read data is less than the threshold; and a fourth set of instructions, adapted to control the mobile communication terminal to repeat for a next data the number of times the data is repeated, and store the repeated next data in the decompressed graphic data.

* * * * *